(12) United States Patent
Wetzer et al.

(10) Patent No.: US 8,595,641 B2
(45) Date of Patent: Nov. 26, 2013

(54) METHODS, APPARATUS AND SYSTEMS FOR DISPLAYING AND/OR FACILITATING INTERACTION WITH SECURE INFORMATION VIA CHANNEL GRID FRAMEWORK

(75) Inventors: Michael Wetzer, Fayetteville, NY (US); Thomas Theriault, Baldwinsville, NY (US)

(73) Assignee: Cyandia, Inc., Syracuse, NY (US)

( * ) Notice: Subject to any disclaimer, the term of this patent is extended or adjusted under 35 U.S.C. 154(b) by 83 days.

(21) Appl. No.: 13/086,258

(22) Filed: Apr. 13, 2011

(65) Prior Publication Data

US 2011/0258573 A1 Oct. 20, 2011

Related U.S. Application Data

(63) Continuation of application No. 12/465,331, filed on May 13, 2009, now Pat. No. 8,499,250.

(60) Provisional application No. 61/052,765, filed on May 13, 2008.

(51) Int. Cl.
*G06F 3/0482* (2013.01)
(52) U.S. Cl.
USPC ........... 715/775; 715/769; 715/810; 715/835; 715/764; 715/757; 726/4; 725/39; 725/46; 345/632; 345/158

(58) Field of Classification Search
USPC ........................................... 715/775
See application file for complete search history.

(56) References Cited

U.S. PATENT DOCUMENTS

| 5,742,286 | A | 4/1998 | Kung et al. |
| 6,189,008 | B1 * | 2/2001 | Easty et al. ........................ 1/1 |
| 6,219,045 | B1 | 4/2001 | Leahy et al. |
| 6,259,448 | B1 * | 7/2001 | McNally et al. .............. 715/733 |
| 6,396,513 | B1 * | 5/2002 | Helfman et al. .............. 715/752 |

(Continued)

FOREIGN PATENT DOCUMENTS

| EP | 2 304 584 | 4/2011 |
| JP | 2006-062142 | 4/1994 |
| JP | 2006-053799 | 2/2006 |
| WO | WO-2004/066105 | 8/2004 |

OTHER PUBLICATIONS

Extended European Search Report for EP Application No. 09747470.4, dated Oct. 12, 2011, 6 pages.

(Continued)

*Primary Examiner* — William Bashore
*Assistant Examiner* — Reza Nabi
(74) *Attorney, Agent, or Firm* — Foley & Lardner LLP; John D. Lanza; Brett P. Belden

(57) ABSTRACT

Facilitating display of, and interaction with, secure user-centric information via a user platform operated by a user. A desktop is displayed on a display device of the user platform as a channel grid framework that includes a plurality of user-selectable items representing a corresponding plurality of authorized channels through which the user receives and/or interacts with respective portions of the secure user-centric information. The plurality of user-selectable items included in the channel grid framework is based at least in part on information access rights and/or security protocols respectively associated with the corresponding plurality of channels, the user, and the user platform.

34 Claims, 5 Drawing Sheets

(56) References Cited

U.S. PATENT DOCUMENTS

| | | | |
|---|---|---|---|
| 6,658,432 B1* | 12/2003 | Alavi et al. | 1/1 |
| 6,671,715 B1 | 12/2003 | Langseth et al. | |
| 6,694,316 B1 | 2/2004 | Langseth et al. | |
| 6,724,403 B1* | 4/2004 | Santoro et al. | 715/765 |
| 6,741,980 B1* | 5/2004 | Langseth et al. | 1/1 |
| 7,028,264 B2 | 4/2006 | Santoro et al. | |
| 7,181,417 B1 | 2/2007 | Langseth et al. | |
| 7,375,678 B2 | 5/2008 | Feyereisen et al. | |
| 7,376,907 B2* | 5/2008 | Santoro et al. | 715/765 |
| 7,478,337 B2* | 1/2009 | Kodosky et al. | 715/771 |
| 7,546,276 B2* | 6/2009 | Randle et al. | 705/65 |
| 7,564,469 B2* | 7/2009 | Cohen | 345/632 |
| 7,627,860 B2* | 12/2009 | Kodosky et al. | 717/141 |
| 7,681,230 B2* | 3/2010 | O'Brien | 726/4 |
| 7,793,232 B2* | 9/2010 | Chaudhri et al. | 715/802 |
| 7,849,226 B2 | 12/2010 | Zigmond et al. | |
| 7,873,371 B2 | 1/2011 | Oberg et al. | |
| 7,933,632 B2* | 4/2011 | Flynt et al. | 455/569.1 |
| 7,979,854 B1 | 7/2011 | Borole et al. | |
| 7,996,862 B2 | 8/2011 | Babu | |
| 8,001,379 B2 | 8/2011 | Daskalopoulos et al. | |
| 8,051,472 B2* | 11/2011 | Maes | 726/8 |
| 8,086,853 B2 | 12/2011 | Warwick | |
| 8,276,196 B1* | 9/2012 | Shipley | 726/6 |
| 2002/0122063 A1 | 9/2002 | Weinberg et al. | |
| 2003/0018967 A1* | 1/2003 | Gorbatov et al. | 725/32 |
| 2003/0018972 A1* | 1/2003 | Arora | 725/47 |
| 2003/0035010 A1 | 2/2003 | Kodosky et al. | |
| 2003/0058277 A1 | 3/2003 | Bowman-Amuah | |
| 2003/0084436 A1* | 5/2003 | Berger et al. | 717/174 |
| 2003/0184595 A1 | 10/2003 | Kodosky et al. | |
| 2004/0003247 A1* | 1/2004 | Fraser et al. | 713/169 |
| 2004/0015367 A1 | 1/2004 | Nicastro et al. | |
| 2004/0082345 A1* | 4/2004 | Lueckhoff | 455/456.3 |
| 2004/0148184 A1* | 7/2004 | Sadiq | 705/1 |
| 2005/0027676 A1 | 2/2005 | Eichstaedt et al. | |
| 2005/0086612 A1 | 4/2005 | Gettman et al. | |
| 2005/0114881 A1* | 5/2005 | Philyaw et al. | 725/25 |
| 2005/0137981 A1* | 6/2005 | Maes | 705/44 |
| 2005/0172018 A1 | 8/2005 | Devine et al. | |
| 2005/0203771 A1 | 9/2005 | Achan | |
| 2005/0246415 A1 | 11/2005 | Belfiore et al. | |
| 2005/0278741 A1 | 12/2005 | Robarts et al. | |
| 2006/0015818 A1* | 1/2006 | Chaudhri et al. | 715/779 |
| 2006/0061580 A1 | 3/2006 | Fujiwara et al. | |
| 2006/0271953 A1* | 11/2006 | Jacoby et al. | 725/34 |
| 2006/0271959 A1 | 11/2006 | Jacoby et al. | |
| 2006/0271960 A1 | 11/2006 | Jacoby et al. | |
| 2006/0271961 A1 | 11/2006 | Jacoby et al. | |
| 2006/0271997 A1 | 11/2006 | Jacoby et al. | |
| 2006/0277469 A1 | 12/2006 | Chaudhri et al. | |
| 2006/0282312 A1 | 12/2006 | Carlson et al. | |
| 2007/0018887 A1* | 1/2007 | Feyereisen et al. | 342/176 |
| 2007/0083616 A1 | 4/2007 | Madden | |
| 2007/0083911 A1 | 4/2007 | Madden et al. | |
| 2007/0088952 A1* | 4/2007 | Hewitt et al. | 713/171 |
| 2007/0101291 A1 | 5/2007 | Forstall et al. | |
| 2007/0101297 A1* | 5/2007 | Forstall et al. | 715/841 |
| 2007/0101368 A1 | 5/2007 | Jacoby et al. | |
| 2007/0101433 A1* | 5/2007 | Louch et al. | 726/25 |
| 2007/0118813 A1 | 5/2007 | Forstall et al. | |
| 2007/0124663 A1 | 5/2007 | Fischer et al. | |
| 2007/0130541 A1* | 6/2007 | Louch et al. | 715/804 |
| 2007/0162051 A1* | 7/2007 | Adler et al. | 715/700 |
| 2007/0186103 A1* | 8/2007 | Randle et al. | 713/168 |
| 2007/0189737 A1 | 8/2007 | Chaudhri et al. | |
| 2007/0192823 A1* | 8/2007 | Andersen et al. | 726/1 |
| 2007/0223462 A1* | 9/2007 | Hite et al. | 370/356 |
| 2008/0005798 A1* | 1/2008 | Ross | 726/26 |
| 2008/0028338 A1* | 1/2008 | Kodosky et al. | 715/835 |
| 2008/0034309 A1* | 2/2008 | Louch et al. | 715/766 |
| 2008/0034314 A1* | 2/2008 | Louch et al. | 715/778 |
| 2008/0066011 A1* | 3/2008 | Urrabazo et al. | 715/810 |
| 2008/0104513 A1 | 5/2008 | Krogh | |
| 2008/0111818 A1 | 5/2008 | Stambaugh | |
| 2008/0120327 A1 | 5/2008 | Bhat | |
| 2008/0126989 A1* | 5/2008 | Flores et al. | 715/833 |
| 2008/0129725 A1 | 6/2008 | Stambaugh | |
| 2008/0141170 A1 | 6/2008 | Kodosky et al. | |
| 2008/0141174 A1* | 6/2008 | Kodosky et al. | 715/835 |
| 2008/0150963 A1 | 6/2008 | Stambaugh | |
| 2008/0168185 A1* | 7/2008 | Robbin et al. | 709/248 |
| 2008/0168245 A1 | 7/2008 | De Atley et al. | |
| 2008/0168391 A1 | 7/2008 | Robbin et al. | |
| 2008/0168526 A1 | 7/2008 | Robbin et al. | |
| 2008/0172173 A1 | 7/2008 | Chang et al. | |
| 2008/0172625 A1 | 7/2008 | Montgomery | |
| 2008/0172632 A1 | 7/2008 | Stambaugh | |
| 2008/0207327 A1* | 8/2008 | Van Luchene et al. | 463/42 |
| 2008/0235601 A1 | 9/2008 | Fried et al. | |
| 2008/0256643 A1* | 10/2008 | Jones et al. | 726/27 |
| 2009/0013263 A1* | 1/2009 | Fortnow et al. | 715/753 |
| 2009/0018712 A1 | 1/2009 | Duncan et al. | |
| 2009/0025025 A1 | 1/2009 | Vleck et al. | |
| 2009/0091578 A1 | 4/2009 | Carnahan et al. | |
| 2009/0113481 A1* | 4/2009 | Friedman | 725/46 |
| 2009/0132942 A1* | 5/2009 | Santoro et al. | 715/765 |
| 2009/0231128 A1* | 9/2009 | Watson et al. | 340/540 |
| 2009/0249069 A1 | 10/2009 | Daskalopoulos et al. | |
| 2009/0254842 A1* | 10/2009 | Leacock et al. | 715/757 |
| 2009/0259972 A1* | 10/2009 | Kodosky et al. | 715/810 |
| 2009/0287914 A1 | 11/2009 | Shah et al. | |
| 2010/0017722 A1 | 1/2010 | Cohen | |
| 2010/0031334 A1 | 2/2010 | Shaikh | |
| 2010/0058188 A1 | 3/2010 | Shah et al. | |
| 2010/0080298 A1 | 4/2010 | Hang et al. | |
| 2010/0083189 A1 | 4/2010 | Arlein et al. | |
| 2010/0122196 A1* | 5/2010 | Wetzer et al. | 715/769 |
| 2010/0131443 A1* | 5/2010 | Agarwal et al. | 706/46 |
| 2010/0162172 A1* | 6/2010 | Aroner | 715/838 |
| 2010/0254370 A1* | 10/2010 | Jana et al. | 370/352 |
| 2010/0274859 A1 | 10/2010 | Bucuk | |
| 2010/0281107 A1* | 11/2010 | Fallows et al. | 709/203 |
| 2010/0299640 A1* | 11/2010 | Titus | 715/848 |
| 2010/0313146 A1* | 12/2010 | Nielsen et al. | 715/757 |
| 2011/0081008 A1* | 4/2011 | Lawson et al. | 379/114.03 |
| 2011/0161234 A1 | 6/2011 | Cuellar et al. | |
| 2011/0252132 A1 | 10/2011 | Wetzer et al. | |
| 2011/0252460 A1* | 10/2011 | Wetzer et al. | 726/4 |
| 2011/0252461 A1* | 10/2011 | Wetzer et al. | 726/4 |
| 2011/0258573 A1 | 10/2011 | Wetzer et al. | |
| 2011/0283259 A1* | 11/2011 | Lawson et al. | 717/121 |
| 2012/0096267 A1* | 4/2012 | Daskalopoulos et al. | 713/169 |

OTHER PUBLICATIONS

International Search Report and Written Opinion for International Application No. PCT/US2009/043790, mailed Jun. 24, 2009, 8 pages.
International Search Report and Written Opinion for PCT Application No. PCT/US2012/022406, mailed May 10, 2012, 12 pages.
Linden Lab, How Meeting in Second Life Transformed IBM's Technology Elite Into Virtual World Believes, 8 pages.
Premium Agency, Inc. Develops MAJUA, Japan's First 3-D HD-Quality In-Browser Plugin, Dec. 1, 2008, http://www.premiumagency.com/majua/.
Project Darkstar, Project Darkstar Community-Home, Mar. 5, 2009, http://www.projectdarkstar.com/.
Project Wonderland Toolkit for Building 3D Virtual Worlds, lg3d-wonderland: Project Wonderland, Mar. 5, 2009, https://lg3d-wonderland.dev.java.net/.
US Notice of Allowance on 098944-0108 DTD May 23, 2013.
US Office Action on 098944-0108 DTD May 23, 2012.
US Office Action on 098944-0108 DTD Sep. 7, 2011.
US Office Action on 098944-0132 DTD Dec. 18, 2012.
US Office Action on 098944-0133 DTD Jan. 3, 2013.

\* cited by examiner

METHODS, APPARATUS AND SYSTEMS FOR DISPLAYING AND/OR FACILITATING INTERACTION WITH SECURE INFORMATION VIA CHANNEL GRID FRAMEWORK

CROSS-REFERENCES TO RELATED APPLICATIONS

The application claims a priority benefit, under 35 U.S.C. §120, as a continuation (CON) of U.S. non-provisional patent application Ser. No. 12/465,331, filed May 13, 2009, entitled "APPARATUS AND METHODS FOR INTERACTING WITH MULTIPLE INFORMATION FORMS ACROSS MULTIPLE TYPES OF COMPUTING DEVICES."

Ser. No. 12/465,331 in turn claims a priority benefit, under 35 U.S.C. §119(e), of U.S. provisional patent application Ser. No. 61/052,765, filed May 13, 2008, and entitled "SYSTEM AND METHOD FOR CONDUCTING BUSINESS IN A VIRTUAL WORLD OR METAVERSE."

Each of the above-identified applications is hereby incorporated herein by reference in its entirety.

BACKGROUND

1. Field of Invention

Embodiments of the present invention relate generally to user-centric information convergence and, more particularly, to apparatus and methods for interacting with multiple information forms across multiple types of computing devices and platforms.

2. Description of the Related Art

Significant strides have been made in creating digital/digitized content of many varieties, including text, graphics, pictures, video, streaming real-time video, remote device control/interaction, three dimensional ("3D") graphic visualization of objects and digital sound.

Dissimilar evolutions of device interfaces on platforms such as computer desktop/laptop screens, mobile devices, and special use displays have created many content interaction metaphors. Users have had to accept that these different physical devices require expertise in each format to make them useful. Information utility has grown and similar content can now be accessed from dissimilar devices but with differing access methods and metaphors.

Browsers were the Internet's early solution to creating a "window" or "portal" onto personalizable content to manage the proliferation and exponentially expanding amount of electronically available information. Some consumer interface technologies have focused on simplification and ease of use. These technologies (ex. Google® or Apple® products) utilize icons and simple text entry to improve usability and simplicity while utilizing sophisticated computing methods to keep the users' display of information to a minimum. These technologies largely remain text or two-dimensional ("2D") graphic-centric.

3D data visualization methods have been limited to narrow deployment largely in the technical Computer Aided Design ("CAD") fields where sophisticated users with specialized training manipulated specialized applications. Advances in 3D gaming technologies have created low cost and mass availability of sophisticated visualization, sound and animation of information, however they lack useful business application due to their primary focus on the user/player's point-of-reference. Gaming technologies treat objects within the 3D framework for visual reference and are poorly suited for complex and cross platform information management solutions.

Therefore, there is a need for a solution that addresses the above and other problems.

SUMMARY

Aspects of the present invention provide a system, method, and computer program product for interacting with multiple information forms across multiple types of computing devices, including interactive displays and communication devices, without the shortcomings of previous systems. A system, method, and computer program product in accordance with the present invention may employ a universal grid of channels to engage in context relevant interactions with any type of content and the content's representation as a selectable item, such as a graphic, picture, video, and the like.

According to an aspect of the invention, a computer-readable storage media is provided for interacting with multiple information forms across computing devices. The computer-readable storage media may include computer-readable instructions configured to cause one or more computer processors to execute the operations including authenticating a user, establishing a channel grid framework for the user on a first platform where the channel grid framework provides access to a first computer application displayed on a display device as a channel. The computer-readable storage media may further include computer-readable instructions configured to cause one or more computer processors to also execute the operations including deploying the channel from the channel grid framework on the first platform to a second platform in response to a user selecting the channel from the channel grid framework on the first platform and performing a copy operation of the channel to the second platform and establishing a run time application of the first computer application on the second platform.

These and other advantages, aspects, and features of the present invention will become more apparent from the following detailed description of embodiments and implementations of the present invention when viewed in conjunction with the accompanying drawings. The present invention is also capable of other embodiments and different embodiments, and details can be modified in various respects without departing from the spirit and scope of the present invention. Accordingly, the drawings and descriptions below are to be regarded as illustrative in nature, and not as restrictive.

BRIEF DESCRIPTION OF THE DRAWINGS

The accompanying drawings illustrate an embodiment of the invention and depict the above-mentioned and other features of this invention and the manner of attaining them. In the drawings.

DETAILED DESCRIPTION

Figure 1:
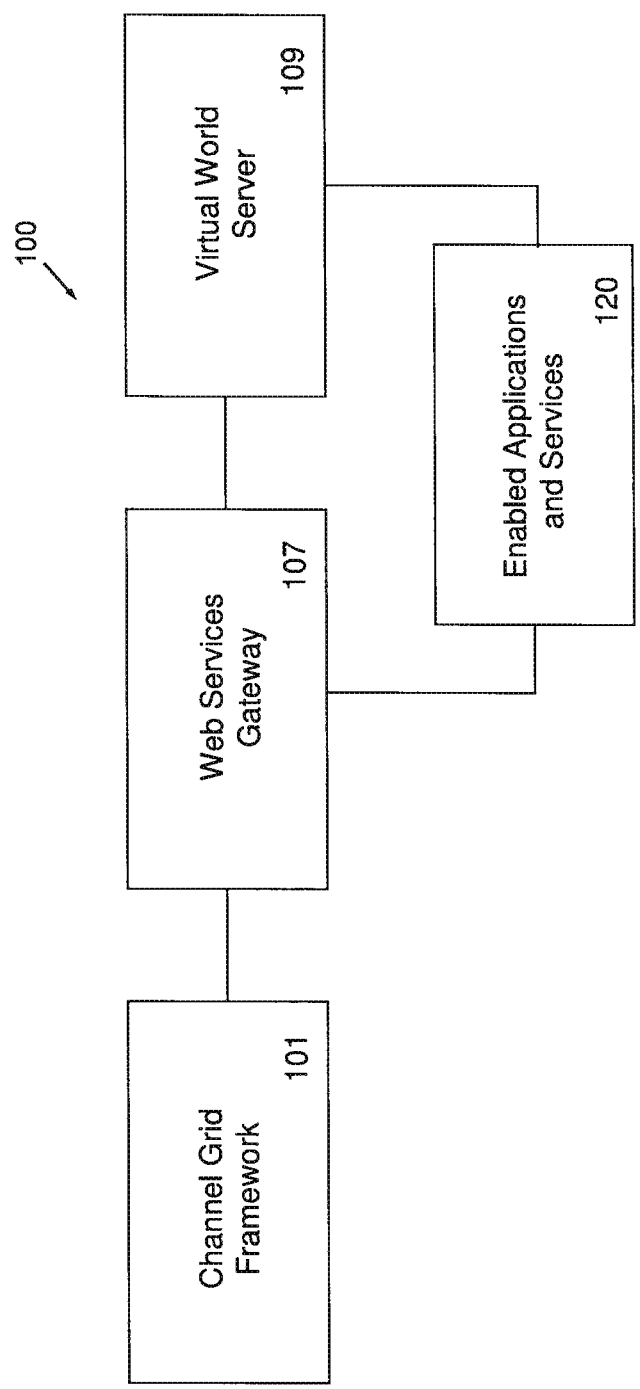
FIG. 1 illustrates a block diagram of a system for conducting business in a virtual world in accordance with an embodiment of the present invention.

The following detailed description of the invention refers to the accompanying drawings and to certain preferred embodiments, but the detailed description does not limit the invention. The scope of the invention is defined by the appended claims and equivalents as it will be apparent to those of skill in the art that various features, variations, and modifications can be included or excluded based upon the requirements of a particular use.

As used in this application, the terms "a", "an" and "the" may refer to one or more than one of an item. The terms "and" and "or" may be used in the conjunctive or disjunctive sense and will generally be understood to be equivalent to "and/or." For brevity and clarity, a particular quantity of an item may be described or shown while the actual quantity of the item may differ, and features from one embodiment may be combined with features of another embodiment. By way of non-limiting example, various components (e.g., channel grid framework 101, content channels 202, and the like) are described and shown, which may perform various functions and interact with each other. These components may be segregated based on their function merely for the sake of description and may represent computer hardware and executable software code which may be stored on a computer-readable storage medium for execution on appropriate computing hardware. The various functions of the different components may be combined or segregated as hardware or software stored on a computer-readable medium in any manner, and may be used separately or in combination.

As can be appreciated from the above discussion, electronic information users are confronted with ever increasing amounts of data. Information technologies are moving beyond traditional computing terminals and equipment onto mobile, television and other special-use displays. Dissimilar formats compounded with increasing amounts of digital content are overwhelming users with data. Information users are now wasting their time locating, putting into context, consolidating, managing multiple versions of, and understanding what is truly meaningful. Users then spend insufficient time contemplating contexts and acting on the information. Inefficiency is increasing and productivity declining. Consumers have a problem meaningfully understanding and efficiently consuming the vast amount of content.

In accordance with an embodiment of the present invention, a common and efficient utility may be provided to interact with multiple information forms across multiple types of computers, interactive displays, and communication devices ("platforms"), in a more effective and efficient manner. Users may define the type and manner of delivery of information. The term "information" should be broadly interpreted to include, by way of non-limiting example, any appropriate type of content or data. Non-limiting examples may include text, graphics, pictures, video, streaming real-time video, remote device control/interaction, 3D graphic visualization of objects, and digital sound. Likewise, the phrase "information forms" as used herein is intended to be synonymous with "information." The term "platforms" should be broadly interpreted to include, by way of non-limiting example, computers, communication devices, and other computing devices. Non-limiting examples include servers, networks of servers, desktop computers, laptop computers, tablet computers, netbook computing devices, telephones, cell phone devices, handheld devices, smart phones, interactive displays, personal digital assistants (PDAs), portable digital assistants, enterprise digital assistants, personal navigation devices, network connected devices, Blu-ray players (or other optical disk players with network access), in-vehicle devices, televisions (set top boxes), virtual machines, and game consoles. Likewise, the term devices used herein is intended to be synonymous.

Information may be delivered to a user based on the user's identity as established by the system when the user's session is established. Because the user is known and authenticated, preferences and rights to certain information types can be defined and managed for the user.

Information relevant to the user may be presented in, by way of non-limiting example, a twelve item grid in the form of "channels." These channels may be preconfigured and may contain any information format. Non-limiting examples include streaming video, audio, voice-over-IP communication, environmental monitoring information, financial services information, enterprise resource planning information, building information modeling, product lifecycle management information, project management information, immersive 3D environments, video conferencing information, RSS reader information, channel application repository information, end-user preferences and localization information, word processing documents, spreadsheets, presentation/slide shows, email, address book information, instant messaging information, enterprise content management information, text, graphics, pictures, video, remote device control/interaction, and 3D graphic visualization of objects. Each channel may be configured to perform complex functions both in how the information is synthesized and delivered as well as what the user may do with it (as may be driven by the identify and authorization granted to the user). The channels may be represented in 2D or 3D form across multiple types of platforms.

The assignment of information priority, event alerts or triggers, and complex actions that can result from the user's interaction with a channel may be built upon and exploited by developers. A development tool or facility may be provided to a developer to create many forms of customization. Triggers may be parameterized against information behavior. Non-limiting examples of triggers may include exceeding a quantified numerical limit and multiple similar events trending in a certain direction. The trigger may cause the information channel to change its appearance or to take other actions that may be implemented by the developer. By way of non-limiting example, one action that may be implemented is to provide a notification to the user.

With respect to the information in a channel, the user may take action by touching, clicking, or otherwise interacting with the channel. Based on the access rights assigned to an individual and the underlying actions enabled through the channel's design, immediate response to an event or a complex logic chain that formed the event may occur. In some instances, the information may require deeper understanding, in which case the channel may expand to more channels, more information, or into a 3D form to aid rapid and effective understanding.

3D representation of objects and other users may be available seamlessly to facilitate context relevant interaction with an easy-to-understand representation of a physical place, object, people, or other users. Touching, clicking, or otherwise interacting with objects or participating users may enable conditional logic to drive further visualization or actions. Events and actions may be carried out from two dimensions to be viewed within a 3D representation. Objects may appear to live in this virtual or representative world (meta-verse) indefinitely on demand from digital representations that may exist in databases as needed.

FIG. 1 illustrates a block diagram of a system 100 for conducting business in a virtual world in accordance with an embodiment of the present invention. The system 100 may include a channel grid framework 101, a web services gateway 107, a virtual world server 109, and enabled applications and services 120. The channel grid framework 101 may be connected to the web services gateway 107. The web services gateway 107 may be connected to the channel grid framework 101, the virtual world server 109, and enabled applications and services 120. The virtual world server 109 may be connected to the enabled applications and services 120. The enabled applications and services 120 may be connected to the web services gateway 107 and the virtual world server 109.

Figure 2:
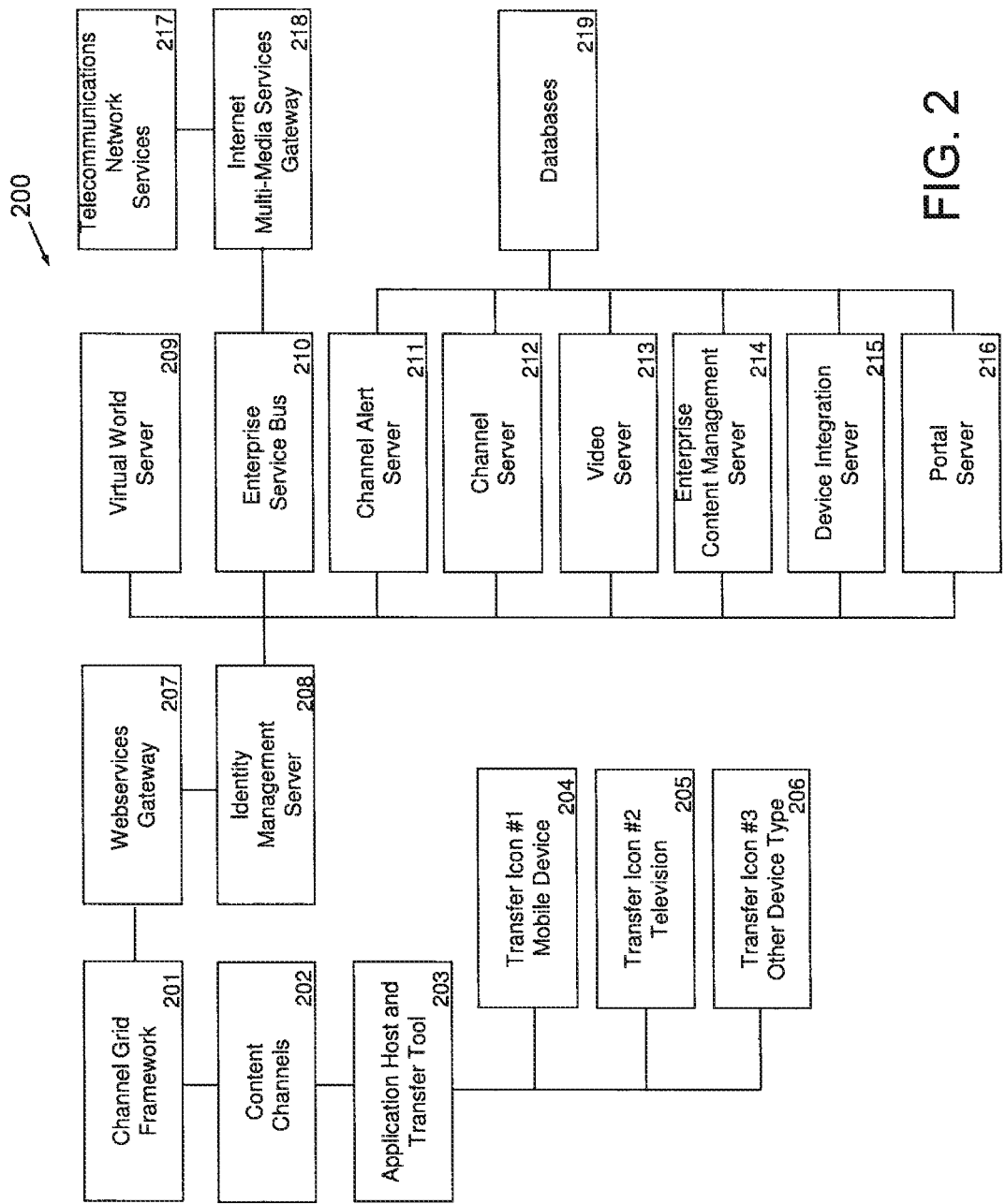
FIG. 2 illustrates a block diagram of a system and method for interacting with multiple information forms across multiple types of platforms in accordance with an embodiment of the present invention.

FIG. 2 illustrates a block diagram of a system 200 for interacting with multiple information forms across multiple types of platforms in accordance with an embodiment of the present invention. The system 200 may include multiple components. As noted above, the various functions of the different components may be combined or segregated as hardware or software. By way of non-limiting example, the components may exist on or as servers or networks of servers, services, or devices. The components may exist in a service-oriented architecture (SOA) that enables each component to exist as a logical component. Similarly, the components may exist on other computers, communication devices, and other computing devices such as desktop computers, laptop computers, mobile telephones, interactive displays, portable digital assistants (PDAs), other network-connected devices, Blu-ray players, in-vehicle devices, televisions, and the like. The system 200 may include a channel grid framework 201, content channels 202, and an application host and transfer tool 203. The application host and transfer tool 203 may include transfer icon #1 mobile device 204, transfer icon #2 television 205, and transfer icon #3 other device type 206. Of course, additional transfer icons may be included as desired. The system 200 may further include a web services gateway 207 and an identity management server 208.

The channel grid framework 201 may be connected to the content channels 202 and the web services gateway 207 through a system bus (not shown) or any suitable network or communication connection. Similarly, the content channels 202 may be connected to the application host and transfer tool 203. The application host and transfer tool 203 may be connected to the transfer icon #1 mobile device 204, the transfer icon #2 television 205, and the transfer icon #3 other device type 206. As noted above, the channel grid framework 201 may be connected to the web services gateway 207. The web services gateway 207 may be connected to the identity management server 208.

The system 200 may further include a virtual world server 209, an enterprise service bus 210, a channel alert server 211, a channel server 212, a video server 213, an enterprise content management server 214, a device integration server 215, and a portal server 216. The system 200 may further include telecommunications network services 217, an Internet multimedia services gateway 218, and multiple databases 219.

The identity management server 208 may be connected to the virtual world server 209, the enterprise service bus 210, the channel alert server 211, the channel server 212, the video server 213, the enterprise content management server 214, the device integration server 215, and the portal server 216. Each of the virtual world server 209, the enterprise service bus 210, the channel alert server 211, the channel server 212, the video server 213, the enterprise content management server 214, the device integration server 215, and the portal server 216 may be connected to one another. The enterprise service bus 210 may be connected to the Internet multimedia services gateway 218, which may be connected to the telecommunications network services 217. The channel alert server 211, the channel server 212, the video server 213, the enterprise content management server 214, the device integration server 215, and the portal server 216 may each be connected to multiple databases 219.

Figure 3:
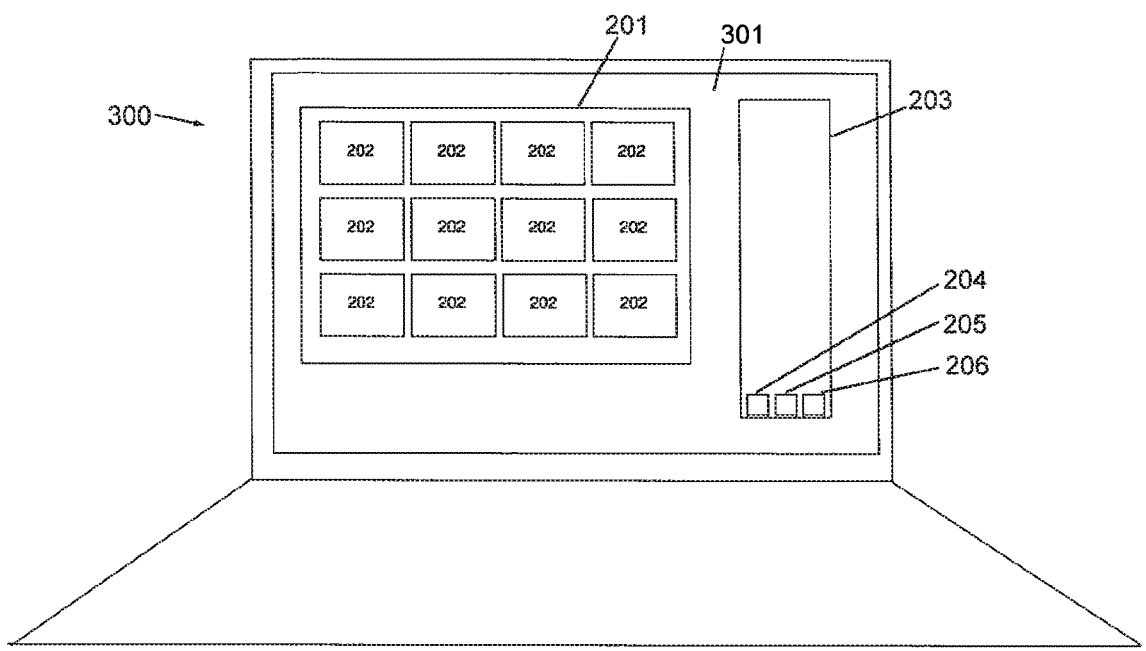
FIG. 3 illustrates a schematic representation of a computer display device displaying a channel grid framework in accordance with an embodiment of the present invention.

In addition to FIG. 2, attention is now directed to FIG. 3, which illustrates a schematic representation of a computer display device 300 displaying the channel grid framework 201 in accordance with an embodiment of the present invention. The channel grid framework 201 may be a hardware device or a software application that displays a twelve channel display layout on a hardware device, such as a computer display device 300. The channel grid framework 201 may be delivered as a web-based browser software application or as a standalone application. Any type of information or content may be assigned to any channel 202. The channel may be displayed on multiple platforms. Although the channel grid framework 201 may display twelve channels 202, the grid may display a larger or smaller number of channels 202. The channel grid framework 201 may include a three-by-four (3.times.4) matrix of square elements. Although the channel grid framework 201 may include a three-by-four matrix of square elements, different configurations may be substituted. The channel grid framework 201 may also provide development, display, security, integration, and related feature implementation of services delivered through and coupled with the web-services gateway 207, where the actual command structure, business logic, and functions of specific channels 202 may be integrated from subordinate application functions as supported by the virtual world server 209, the enterprise service bus 210, the channel alert server 211, the channel server 212, the video server 213, the enterprise content management server 214, the device integration server 215, the portal server 216, the telecommunications network services 217, the Internet multimedia services gateway 218, and multiple databases 219.

Each of the channels 202 may be representative of any form of information or content. Non-limiting examples include static icons which may activate further functions and full motion multimedia. An unlimited number of direct commands, access to subordinate grids or functions may be assigned to the channel 202 by a developer. A user may access specific channels 202 and interact with them based on the user's profile that has been established and is managed by the identity management server 208. A channel 202 may be developed through the use of services available to the developer. The use of these services may include web services gateway 207, identity management server 208, virtual world server 209, the enterprise service bus 210, the channel alert server 211, the channel server 212, the video server 213, the enterprise content management server 214, the device integration server 215, the portal server 216, and the Internet multimedia services gateway 218. The channel information (e.g., content), enabling alerts, and integration to these services may reside in multiple databases 219.

The application host and transfer tool 203 may be a separate software application that may be installed on a specific hardware device such a computer, communication device, or other computing device. Non-limiting examples include a server, a network of servers, a desktop computer, a laptop computer, a tablet computer, a net-book computing device, a telephone, a cell phone device, a handheld device, a smart phone, an interactive display, a personal data assistant (PDA), an enterprise digital assistant, a personal navigation device, a network connected device, a Blu-ray player (or other optical disk player with network access), an in-vehicle device, a set-top box (television), a virtual machine, a game console, and the like. The application host and transfer tool 203 may allow for individual channels residing in the desktop channel grid framework 201 to be "dragged and dropped" (by, as a non-limiting example, clicking, holding, moving and releasing) out of the desktop channel grid framework 201 and into the application host and transfer tool 203. The dropping of a channel 202 on the application host and transfer tool 203 may trigger a server event that may download a copy of the channel into the application host and transfer tool 203. Once the channel 202 is installed onto the application host and transfer tool 203, the channel may then be an independent entity, the desktop channel grid framework 201 can be closed, and the channel(s) 202 residing in the application host and transfer tool 203 can be utilized. Channels 202 residing in the application host and transfer tool 203 can be transferred to other registered devices or platforms (such as from a desktop computer to a mobile telephone) by "dragging and dropping" the channel 202 on top of one the registered device icons located on, by way of non-limiting example, the application host and transfer tool 203 dock. The drag and drop event may trigger a download of the device specific application to the intended device or platform. Channels 202 residing in the application host and transfer tool 203 may also be "dragged" outside of the application host and transfer tool 203 onto the device "desktop" and be interacted with. All functions and features may remain operable and synchronized across all registered devices or platforms invoked through the transfer command for 204, 205 and 206 through the web services gateway (207) in a manner similar to the channel grid framework's 201 instantiation. The channel 202 may then appear in the channel grid framework 201 and on the desktop 301. Functions and features of the channel 202 remain operable and synchronized across all registered platforms invoked through the copy or transfer command through the web services gateway 207 to the channel server 212 and channel alert server 211 to allow full engagement of the functions provided by the channel 202.

Transfer icon #1 mobile device 204, transfer icon #2 television 205, and transfer icon #3 other device type may each be a hardware device or software application. If a selected channel 202 exists in the application host transfer tool 203, the channel 202 may be moved to a transfer icon through a drag and drop instruction. During a drag and drop function, the channel 202 may be transformed to become available on a selected platform (e.g., a mobile device). During an initial configuration of channels 202, a user profile may be established which may identify user preferences, platform identities, and service support instructions as to how the user wishes information to behave on the selected platform. The selected platform may need to be electronically connectable such as through the Internet, close over-the-air mechanism (e.g., Bluetooth®), or through a wired connection. When the channel 202 appears on the selected platform, it may retain all of its original native functionality from the channel grid framework 201 if it has been configured or programmed to do so. The application host and transfer tool 203 transfer icons 204, 205, 206 may serve as trigger mechanisms, each to activate a channel download to a specific, registered device or platform. The download may be activated by a drag and drop of an application host and transfer tool 203 in which channel 202 application resides onto a transfer icon 204, 205, 206, which, in turn, may send the download request to a remote server application where the appropriate and device or platform specific application may be downloaded to the requesting device or platform.

The web services gateway 207 may be an Internet-based hardware device or software tool through which the channel grid framework 201 may interact with external applications and services. When a user selects a specific channel 202 an instruction from the channel grid framework 201 may pass through the web services gateway 207 to interact with the identity management server 208. A user may be authenticated along with the registries to all services, applications, and information that may be involved with that performance of the function of channel 202. Once authenticated, the request for activity may be processed by one or more of the enterprise service bus 210, the channel alert server 211, the channel server 212, the video server 213, the enterprise content management server 214, the device integration server 215, the portal server 216, the Internet multimedia services gateway 218, the virtual world server 209 and the multiple databases 219. The information or service function to be performed or processed may then be processed back through the identity management server 208 for authorization, then transformed back into the channel characterization as defined in the channel grid framework 201 and displayed as a channel 202.

The identity management server 208 may be a hardware device or software application that may provide user, application, device, location, equipment and information authentication. When a channel 202 is initially created, the application and its information access and security protocols that are required may be identified. When a user is associated with a channel 202 or specific services that may be enabled by the channel 202, access and security protocols may be identified for each condition and action to be performed by the user. This information may be stored in a secure and specific database 219. Every time the channel 202 is invoked or interrogated, both the security of the applications affected as well as the security of the user may be confirmed. Once authorized, the channel 202 services may be performed, and the content provided by the computer application on the channel 202 may be evaluated. The interrogation of the channel 202 may be bi-directional, where the channel 202 may interrogate the identity management server 208 to evaluate content and determine if the channel 202 services are available, and similarly, the identity management server 208 and the web services gateway 207 may be configured to interrogate the channel 202 in the channel grid framework 201 to evaluate content provided by the first computer application.

The virtual world server 209 may be a 3D software application or a device and may be used to provide visualization of information, command actions, or functions, and collaboration among electronically-connected participants. By way of non-limiting example, teleconference attendees may be visualized as floating orbs. Other users on separate platforms may also serve as video conference attendees. Within the virtual world server 209, an instantaneous visualization of objects in 3D may serve as a method to access information as well as an ability to command actions, or perform functions. These objects may each have associated data or metadata attached. When the user interacts (by way of non-limiting example by touching, clicking, or performing other commands) with an object, the virtual world server 209 may access the data or metadata or a related application as desired by the developer. All interactions with information, command actions, or functions may pass through the identity management server 208 and the web services gateway 207, and may be displayed in native applications or through a channel 202.

The enterprise services bus 210 may be a hardware device or software application that may manage multiple information control, application integration, and user enabled instructions. It may be the primary integration utility to all applications, information and communications. When a developer creates a channel's 202 business logic, associated commands, information transactions, user class entitlements and workflow, they may be stored in databases 219. The enterprise service bus 210 may call the instructions and information from these databases 219 and enable the command to be serviced and the action requirements to be satisfied.

The channel alert server 211 may be a hardware device or software application that may continually monitor application and information activities defined by a channel. By way of non-limiting example, a user or developer may define threshold conditions with definitive values assigned to events, conditions, logical workflows, discrete information values or signal data. If an established condition is met, the channel alert server 211 may notify the identity management server 208 to confirm the subscriber of the event, determine the active devices of the subscriber, and then pass through the web services gateway 207 and the channel grid framework 201 to provide a visual or auditory alert in the channel 202. Likewise, the alert may trigger additional actions affecting the channel 202 and the underlying computer application. For example, a channel may be established to monitor an alarm condition of a business or residence. If a condition at the business or residence triggers an alarm, an additional alert action such as notifying a law enforcement agency or a protective services group may be triggered. The alert can appear as defined on other platforms such as a mobile device, a television (set top box), a Blu-ray player, or other devices.

The channel server 212 may be a hardware device or a software application which may define the visual characterization, functions, information, and features of a channel 202. The channel description and all related information may be stored in databases 219. All channels may be stored in a channel repository located within the channel server 212. When a channel 202 is added to the channel grid framework 201 or the application host and transfer tool 203, software calls or hardware signals may be made to the channel server 212 to request a device specific download action to be performed. The download may occur over, by way of non-limiting example, wired/wireless Internet via TCP-IP, Bluetooth, or local cable via USB cable. This action may route through the enterprise service bus 210 based on logic associated to the channel 202. Specific actions and information to be displayed may be served or serviced through the identity management server 208, and on to the target device.

The video server 213 may be a hardware device or software application that may provide application services to transform, transmit, and support the delivery of information in the form of video and audio. The channel server 212, enterprise content management server 214, and databases 219 may be accessed by the video server 213 for content.

The enterprise content management server 214 may be a hardware device or a software application that may provide primary configuration, templates, user interface controls and management control over the information displayed on a channel 202. The originating application data from all applications that are invoked through a channel call may route through the enterprise content management server 214. All images, charting, icons, artwork and other forms of digital art that make up the user experience may be stored in the enterprise content management server repository 214. Metadata associated with the request, action, data, user, and time may be managed in an associated database 219.

The device integration server 215 may be a hardware device or software application that may manage the connection between a channel 202 and any application or information source containing streaming or real-time information from a machine or device. The device integration server 215 may support the interchange of Internet protocol based information commands. A user invoking a channel 202 associated with this information type, and authorized to do so by the identity management server 208, whether displayed in the virtual world server 209 or directly to the channel 202, may command a function. By way of non-limiting example, a user may send a command to an actual physical thermostat in the actual physical world as a display in the virtual world server. The device integration server may store real-time data captured from devices in multiple databases 219 for later retrieval.

The portal server 216 may be a hardware device or software application that may facilitate Internet function access by the web services gateway 207. This utility may be used to call other Internet-based functions and services by the web services gateway 207.

The telecommunications network services 217 may provide content distribution and retrieval services for channels 202 through telecommunication wireline and wireless services.

The enterprise service bus 210 may send all data traffic requests to applications, services and systems.

The Internet multi-media services gateway 218 may serve as the specific implementation of network traffic protocols, applications and services to specific telecommunications providers.

The databases 219 may exist to manage commands, applications, information, and user profiles.

The operation of the system 200 for interacting with multiple information and data forms across multiple types of computers, interactive displays, communication devices, and computing devices is now described with reference to FIGS. 4 and 5.

Figure 4:
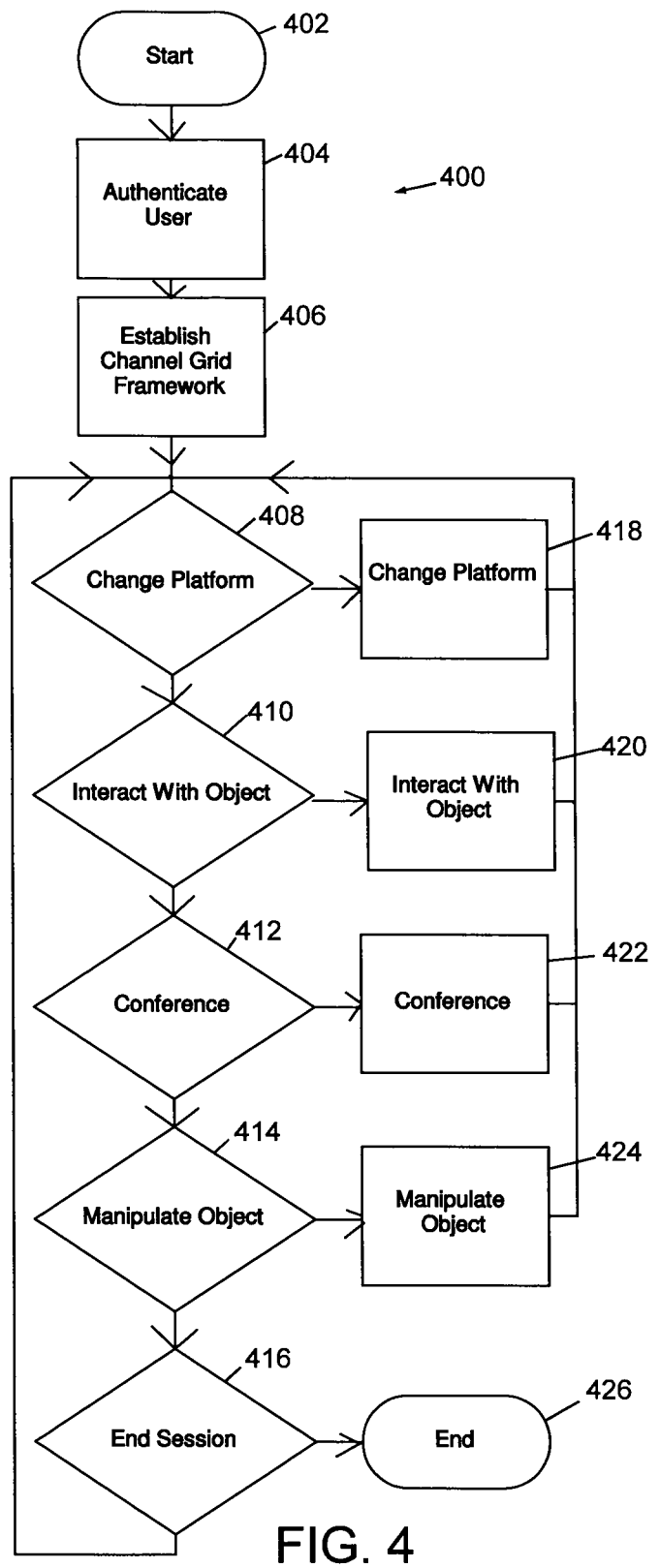
FIG. 4 illustrates a flowchart of an exemplary method of interacting with a channel in accordance with an embodiment of the present invention.

FIG. 4 is a flowchart of an exemplary method 400 of interacting with a channel. In operation 402, the method 400 may begin. In operation 404, a user may be authenticated. The user may initiate the channel grid framework 201, and provide authentication data. The authentication data may pass through the web services gateway 207 to the identity management server 208 for authentication.

After authenticating the user in operation 404, the channel grid framework 201 may be established for the user on a first platform or device in operation 406. The channel grid framework 201 may display twelve channels 202. A channel 202 may be representative of any form of information or content. As a non-limiting example, the channel 202 may represent a temperature in a specific building as measured by a thermostat sensor. In displaying the channel 202, the channel 202 may be authenticated by the identity management server 208.

In operation 408, the user may determine whether to transfer the channel 202 from the first platform or device to a second platform or device. If the user determines to transfer the channel 202 from the first platform or device to the second platform or device, operation 418 may be performed and the channel 202 may be deployed from the first platform or device to the second platform or device by selecting the channel 202 and dragging that channel 202 from the channel grid framework 201. The selection and dragging of the channel 202 may be according to the method shown in FIG. 5 and discussed below. The method 400 may return to operation 408. If in operation 408 the user does not determine to transfer the channel 202, the method 400 may proceed to operation 410.

In operation 410, the user may determine whether to interact with a 3D digital instance of a physical object in a 3D workspace to access information related to the physical object. If the user determines to interact with the 3D digital instance of the physical object in the 3D workspace, operation 420 may be performed. The user may be presented with the 3D workspace using the virtual world server 209. In the 3D workspace, the 3D digital instance of the physical object may appear. The user may select or otherwise interact with the 3D digital instance of the physical object to access information related to the physical object. Further to the non-limiting example where the channel 202 may represent the temperature in the specific building as measured by the thermostat sensor, the user may select or otherwise interact with a 3D digital instance of the thermostat. As a non-limiting example, the user may obtain a service history of the thermostat.

In the 3D workspace, the underlying functionalities of a channel 202 (identity, web services, enterprises services bus, databases) may be accessed in the same way as they would be using a channel 202 interface on the channel grid framework 201. By way of non-limiting example, when a user selects a specific channel 202, an instruction from the channel grid framework 201 may pass through the web services gateway 207 to interact with the identity management server 208. The user may be authenticated along with the registries to all services, applications, and information that may be involved with that performance of the function of channel 202. Once authenticated, the request for activity may be processed by one or more of the enterprise service bus 210, the channel alert server 211, the channel server 212, the video server 213, the enterprise content management server 214, the device integration server 215, the portal server 216, the Internet multimedia services gateway 218, the virtual world server 209, and the multiple databases 219. The information or service function to be performed or processed may then be processed back through the identity management server 208 for authorization, then transformed back into the channel characterization as defined in the channel grid framework 201 and displayed as the channel 202. Similarly, from the 3D workspace, the operations may occur.

The method may return to operation 408. If in operation 410 the user does not determine to interact with the 3D digital instance of the physical object, the method 400 may proceed to operation 412.

In operation 412, the user may determine whether to interact with a 3D avatar (an electronic representation of a human or other) of a second user in a 3D workspace to be displayed on both the user's platform or device and the second user's platform or device. If the user determines to interact with the 3D avatar of the second user in the 3D workspace, operation 422 may be performed. The user may be presented with the 3D workspace using the virtual world server 209. The second user may also be presented with the 3D workspace using the virtual world server 209. The first and second users may be on different platforms or devices. In the 3D workspace, the user may be represented by a 3D avatar of the user. The second user may be represented by the 3D avatar of the second user. The 3D avatars of the user and the second user may interact in the 3D workspace. The method may return to operation 408. If, in operation 412, the user does not determine to interact with the 3D avatar of the second user in the 3D workspace, the method may proceed to operation 414.

In operation 414, the user may determine whether to interact with a 3D digital instance of a physical object in a 3D workspace to implement a change in the 3D digital instance to implement a corresponding physical change in the physical object. If the user determines to interact with the 3D digital instance of the physical object in the 3D workspace, operation 424 may be performed. The user may be presented with the 3D workspace using the virtual world server 209. In the 3D workspace, a 3D digital instance of a physical object may appear. The user may implement a change in the 3D digital instance of the physical object to implement a corresponding physical change in the physical object. Further to the non-limiting example where channel 202 may represent the temperature in the specific building as measured by a thermostat sensor, the user may increase the desired temperature in the 3D digital instance of the physical thermostat. Accordingly, the physical thermostat's setting may experience a corresponding increase in the desired temperature. The method may return to operation 408. If in operation 414 the user does not determine to interact with the 3D digital instance of the physical object in the 3D workspace, the method 400 may proceed to operation 416.

In operation 416, the user may determine whether to end the current session. If the user determines not to end the current session, the method 400 may return to operation 408. If the user does determine to end the current session, the method 400 may proceed to operation 426 and ends.

It should be noted that although FIG. 4 shows determinations occurring at particular points during the method, the determinations, like other operations, may be made at different points during the method, and differently relative to one another.

Figure 5:
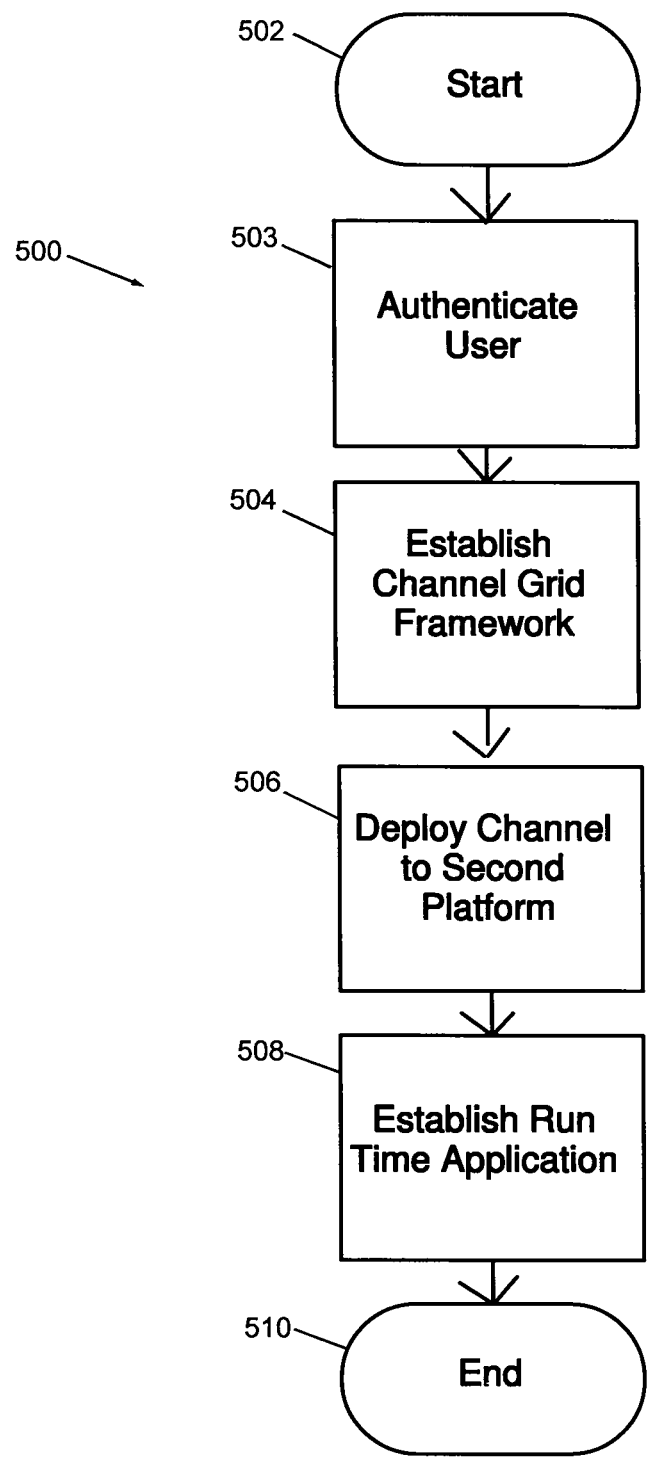
FIG. 5 illustrates a flowchart of a method of transferring a channel from a first platform to a second platform in accordance with an embodiment of the present invention.

FIG. 5 is a flowchart of an exemplary method 500 of transferring a channel from a first platform or device to a second platform or device. In operation 502, the method 500 may begin.

In operation 503, a user may be authenticated. In operation 504, a channel grid framework 201 for the user may be established on a first platform or device. The channel grid framework 201 may provide access to a first computer application displayed on a display device as a channel 202. The channel 202 may be displayed on the first platform or device in a channel grid framework 201. As noted above, the channel server 212 may define the visual characterization, functions, information, and features of the channel 202. The channel description and all related information may be stored in databases 219. All channels may be stored in a channel repository located within the channel server 212. When the channel 201 is added to the channel grid framework 201, software calls or hardware signals may be made to the channel server 212 to request a device specific download action to be performed. This action may route through the enterprise service bus 210 based on logic associated to the channel 202. Specific actions and information to be displayed may be served or serviced through the identity management service 208, and on the target device.

In operation 506, the channel 202 may be deployed from the channel grid framework 201 on the first platform or device to a second platform or device in response to the user selecting the channel from the channel grid framework 201 on the first platform or device and performing a copy operation of the channel 202 to the second platform or device. The selecting may include a dragging of the channel 202 out of the channel grid framework 201 and onto the application host and transfer tool 203 where the channel 202 may then be directed to a registered computing device. The channel grid framework 201 may be a browser-based software application or a stand-alone software application. The first platform or device may be running, and the channel grid framework 201 may be compatible with JavaFX™, Microsoft Silverlight™, Adobe Flex™, and similar proprietary and open source rich Internet application software frameworks, for example. The selection of the channel 202 may include using a rich Internet application or a similar class of software tools delivered via a browser or via a sandbox or virtual machine. For example, JavaFX™, Microsoft Silverlight™, Adobe Flex™, and similar proprietary and open source software tools may be used to provide additional functionality of the application host and transfer tool 203 to enable dragging of the channel 202 from the channel grid framework 201 to an icon 204, 205, or 206 on the desktop 301 of the first platform or device. The icon 204, 205, or 206 may represent the second platform or device. While the rich Internet applications, such as JavaFX™, Microsoft Silverlight™, Adobe Flex™, and similar proprietary and open source software tools may be used to provide dragging functionality within the channel grid framework 201, the additional functionality of the application host and transfer tool 203 may provide the dragging functionality independent of the channel grid framework 202. Similarly to operation 504, when the channel 201 is added to the application host and transfer tool 203, software calls or hardware signals may be made to the channel server 212 to request a device specific download action to be performed.

In operation 508, a runtime application of the channel 201 may be established on the second platform or device. This may result in the channel 201 being displayed and becoming operational on the second platform or computing device. In operation 510, the method 500 ends.

The foregoing description discloses only exemplary embodiments of the invention. Modifications of the above-disclosed embodiments of the present invention of which fall within the scope of the invention will be readily apparent to those of ordinary skill in the art. By way of non-limiting example, although many items are shown as software applications (e.g., the channel grid framework 201), one or more of these items may also be embodied as hardware, or as a combination of software and hardware. Further, although one or more components are disclosed as existing in a SOA architecture, one or more components may exist as separate components, and may be merged or separated differently.

The devices and subsystems of the exemplary embodiments of FIGS. 1-5 are for exemplary purposes, as many variations of the specific hardware used to implement the exemplary embodiments are possible, as will be appreciated by those skilled in the relevant arts. By way of non-limiting example, the functionality of one or more of the devices and subsystems of the exemplary embodiments of FIGS. 1-5 can be implemented via one or more programmed computer systems or devices, including server computers, client computers, and the like.

To implement such variations as well as other variations, a single computer system can be programmed to perform the special purpose functions of one or more of the devices and subsystems of the exemplary embodiments of FIGS. 1-5. On the other hand, two or more programmed computer systems or devices can be substituted for any one of the devices and subsystems of the exemplary embodiments of FIGS. 1-5. Accordingly, principles and advantages of distributed processing, such as redundancy, replication, and the like, also can be implemented, as desired, to increase the robustness and performance of the devices and subsystems of the exemplary embodiments of FIGS. 1-5.

The devices and subsystems of the exemplary embodiments of FIGS. 1-5 can store information relating to various processes described herein. This information can be stored in one or more memories, such as a hard disk, optical disk, magneto-optical disk, RAM, and the like, of the devices and subsystems of the exemplary embodiments of FIGS. 1-5. One or more databases of the devices and subsystems of the exemplary embodiments of FIGS. 1-5 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-5 can include appropriate data structures for storing data collected and/or generated by the processes of the devices and subsystems of the exemplary embodiments of FIGS. 1-5 in one or more databases thereof.

All or a portion of the devices and subsystems of the exemplary embodiments of FIGS. 1-5 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments of FIGS. 1-5 can be implemented on the World Wide Web. In addition, the devices and subsystems of the exemplary embodiments of FIGS. 1-5 can be implemented by the preparation of application-specific integrated circuits or by interconnecting an appropriate network of conventional component circuits, as will be appreciated by those skilled in the electrical arts. Thus, the exemplary embodiments are not limited to any specific combination of hardware circuitry and/or software.

As stated above, the devices and subsystems of the exemplary embodiments of FIGS. 1-5 can include computer readable storage media or memories for holding instructions programmed according to the teachings of the present invention and for holding data structures, tables, records, and/or other data described herein. Computer readable storage media can include any suitable medium that participates in providing instructions to a processor for execution. Such a medium can take many forms, including but not limited to, non-volatile media, volatile media, transmission media, and the like. Non-volatile media can include, by way of non-limiting example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable storage media can include, by way of non-limiting example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

Although embodiments of the present invention have been shown and described, the present invention is not so limited, but rather covers various modifications and equivalent arrangements, which fall within the purview of the claims and their equivalents.

The invention claimed is:

1. An apparatus serving as a user platform operated by a user to facilitate display of, and interaction with, secure user-centric information, the apparatus comprising:
   a display device to display a desktop for the user platform;
   at least one communication interface to facilitate wired and/or wireless communications via one or more transmission media;
   at least one memory to store processor-executable instructions; and
   at least one processor communicatively coupled to the display device, the at least one communication interface, and the at least one memory, wherein upon execution of the processor-executable instructions by the at least one processor, the at least one processor manages display of and interaction with the secure user-centric information by:
      A) controlling the display device to display the desktop for the user platform as a channel grid framework including a matrix having a plurality of user-selectable items representing a corresponding plurality of authorized channels through which the user receives and/or interacts with respective portions of the secure user-centric information, and
      B) receiving configuration information from the user and transmitting the configuration information to at least one external computing device, wherein the configuration information is configured to cause the at least one external computing device to establish a user profile identifying user preferences, platform identities, and service support instructions that determine how the plurality of authorized channels behave on the user platform, wherein the at least one external computing device is configured to synchronize functions and features of one or more of the plurality of channels across a plurality of user platforms by deploying secure user-centric information to the plurality of user platforms;
   wherein at least a portion of the user-centric information provided to the user through the plurality of authorized channels is based at least in part on information access rights and/or security protocols respectively associated with the corresponding plurality of authorized channels, the user, and the user platform, and wherein at least a portion of the user-centric information provided to the user through the plurality of authorized channels is based at least in part on the user profile and is provided to the user without being requested by the user; and
   wherein at least a portion of the secure user-centric information provided to the user through the plurality of authorized channels is received based in part on a bi-directional interrogation of one or more of the plurality of authorized channels, wherein the bi-directional interrogation comprises the one or more of the plurality of authorized channels interrogating an identity management server, and wherein the bi-directional interrogation further comprises the identity management server and a web services gateway interrogating the one or more of the plurality of authorized channels, wherein the web services gateway is a tool through which the channel grid framework interacts with the identity management server.

2. The apparatus of claim 1, wherein:
   the plurality of authorized channels includes at least a first authorized channel through which the user receives and/or interacts with first authenticated channel information constituting a first portion of the secure user-centric information;
   the first authenticated channel information is provided by at least one authenticated channel application and/or at least one authenticated service; and
   the plurality of user-selectable items displayed in A) includes at least a first user-selectable item representing the first authorized channel.

3. The apparatus of claim 1, wherein the user platform includes at least one of:
   a desktop computer;
   a laptop computer;
   a tablet computer;
   a net-book computing device;
   a handheld computing device;
   a personal, enterprise, or portable digital assistant;
   a telecommunications device including one of a telephone, a cell phone, and a smart phone;
   a personal navigation device;
   a vehicle-based device;
   an optical disk player;
   a television; and
   a game console.

4. The apparatus of claim 1, wherein the secure user-centric information includes at least one of:
   text information;
   graphic information;
   one or more pictures;
   one or more videos;
   audio or digital sound;
   streaming data, audio or video;
   content associated with an executing computer application;
   voice-over-IP communication;
   instant messaging/SMS information;
   video-conferencing information;
   environmental monitoring information;
   financial services information;
   enterprise resource planning information;
   enterprise content management information;
   building information;
   project management information;
   product lifecycle management information;
   RSS (Really Simple Syndication) reader information;
   remote device control/interaction information;
   a three-dimensional graphic visualization of one or more objects and/or immersive environments;
   one or more word processing documents;
   one or more spreadsheets;
   one or more presentation/slide shows;
   email; and
   address book information.

5. The apparatus of claim 1, wherein the at least one communication interface includes a web services gateway communicatively coupled to the at least one external computing device via the one or more transmission media.

6. The apparatus of claim 1, wherein the channel grid framework includes a two-dimensional array of the user-selectable items.

7. The apparatus of claim 1, wherein the channel grid framework occupies a majority of the desktop.

8. The apparatus of claim 1, wherein the channel grid framework includes a twelve-item grid of the user-selectable items.

9. The apparatus of claim 1, wherein the user-selectable items included in the channel grid framework are identically-sized rectangular user-selectable items.

10. The apparatus of claim 1, wherein the channel grid framework includes a matrix of square elements respectively constituting the user-selectable items.

11. The apparatus of claim 1, wherein the channel grid framework includes a three-by-four matrix of the user-selectable items.

12. The apparatus of claim 1, wherein the channel grid framework includes a plurality of channel grids, each channel grid of the plurality of channel grids including a configured group of the plurality of user-selectable items.

13. The apparatus of claim 1, wherein:
the plurality of authorized channels includes a first channel through which the user receives and/or interacts with first channel information constituting a first portion of the secure user-centric information;
the plurality of user-selectable items includes a first user-selectable item representing the first channel; and
A) comprises controlling the display device so as to render the first user-selectable item in the channel grid framework as one of:
a graphic representative of the first channel information;
a picture representative of the first channel information; and
a dynamic window including at least one of:
content from an executing computer application constituting the first channel information;
a video representative of the first channel information;
streaming data, audio or video constituting at least a portion of the first channel information; and
polled data derived from the first channel information.

14. The apparatus of claim 13, wherein:
the plurality of authorized channels further includes a second channel through which the user receives and/or interacts with second channel information constituting a second portion of the secure user-centric information;
the plurality of user-selectable items further includes a second user-selectable item representing the second channel; and
A) comprises controlling the display device so as to:
A1) render the first user-selectable item in the channel grid framework as a first dynamic window including at least one of:
first content from a first executing computer application constituting the first channel information;
a first video representative of the first channel information;
first streaming data, audio or video constituting at least a portion of the first channel information; and
first polled data derived from the first channel information; and
A2) render the second user-selectable item in the channel grid framework as a second dynamic window including at least one of:
second content from a second executing computer application constituting the second channel information;
a second video representative of the second channel information;
second streaming data, audio or video constituting at least a portion of the second channel information; and
second polled data derived from the second channel information.

15. The apparatus of claim 13, wherein the at least one processor further manages display of and interaction with the secure user-centric information by:
moving the first user-selectable item from a first location in the channel grid framework displayed on the user platform to a different second location in the channel grid framework displayed on the user platform in response to a user input from the user.

16. The apparatus of claim 1, wherein each user-selectable item of the plurality of user-selectable items included in the channel grid framework is implemented by execution of the processor-executable instructions as a channel container having a unique name and a unique location in the channel grid framework.

17. The apparatus of claim 16, wherein the channel container comprises a plurality of layers, and wherein the plurality of layers comprises:
an icon layer including a static or dynamic image;
a hover layer to display, in response to a mouse-over event, at least one of static descriptive text, dynamic text, a channel configuration description and an alert configuration description;
a data layer;
a configuration layer to display a channel customization form; and
an alert layer.

18. The apparatus of claim 1, wherein the at least one processor further manages display of and interaction with the secure user-centric information by:
C) controlling the at least one communication interface so as to receive from at least one external computing device first channel information relating to at least one authorized channel of the plurality of authorized channels, based at least in part on the information access rights and/or security protocols respectively associated with the corresponding plurality of authorized channels, the user, and the user platform.

19. The apparatus of claim 18, wherein the at least one external computing device stores a user profile to identify user preferences, platform identities, and service support instructions that determine how the secure user-centric information behaves on the user platform.

20. The apparatus of claim 18, wherein the at least one external computing device stores an authentication directory to provide the information access rights and/or security protocols respectively associated with the corresponding plurality of authorized channels, the user, and the user platform, the authentication directory including a plurality of user accounts, a plurality of device accounts, and a plurality of application accounts, and wherein:
in A), the plurality of user-selectable items included in the channel grid framework is based at least in part on the authentication directory; and
in C), the first channel information received from the at least one external computing device and relating to the at least one authorized channel of the plurality of authorized channels is based at least in part on the authentication directory.

21. The apparatus of claim 18, wherein the plurality of user-selectable items includes a first user-selectable item representing the at least one authorized channel, and wherein in response to the user selecting the first user-selectable item, the at least one processor further manages the display of and interaction with the secure user-centric information by:
D) controlling the display device so as to replace the channel grid framework with an expanded first channel representation of the first channel information.

22. The apparatus of claim 21, wherein the expanded first channel representation includes a substantially full-screen two-dimensional representation or simulated three-dimensional representation of the first channel information.

23. The apparatus of claim 22, wherein:
the expanded first channel representation includes the simulated three-dimensional representation of the first channel information;
the first channel information relates to a physical place, one or more objects, and/or one or more people; and
the simulated three-dimensional representation includes virtual representations of the physical place, the one or more objects, and/or the one or more people.

24. The apparatus of claim 18, wherein in A), the at least one processor further controls the at least one display device so as to render at least a first user-selectable item of the plurality of user-selectable items included in the channel grid framework to provide at least one visual alert based on one or more events, conditions, logical workflows, discrete information values or signal data relating to the first channel information.

25. The apparatus of claim 24, wherein the at least one processor controls the display device to change an appearance of the first user-selectable item to provide the at least one visual alert as at least one of:
text and/or an image;
a new data value;
a chart;
streaming text or video; and
an animation.

26. The apparatus of claim 24, wherein the at least one processor controls the display device so as to render the at least one visual alert by replacing the channel grid framework with an expanded first channel representation of the first channel information.

27. The apparatus of claim 26, wherein the expanded first channel representation includes a substantially full-screen two-dimensional representation or simulated three-dimensional representation of the first channel information.

28. The apparatus of claim 24, wherein in response to the user hovering over the first user-selectable item without selecting the first user-selectable item, the at least one processor controls the at least one display device to display an alert tool to allow the user to define or select at least one of:
at least one threshold condition or parameter for interrogating the first channel information so as to determine the one or more events, conditions, logical workflows, discrete information values or signal data relating to the first channel information; and
at least one user preference for taking action in response to the determined one or more events, conditions, logical workflows, discrete information values or signal data relating to the first channel information.

29. The apparatus of claim 28, wherein the at least one condition or parameter includes a numerical limit or a trend.

30. The apparatus of claim 28, wherein the at least one user preference includes:
at least one alert to be generated in response to the determined one or more events, conditions, logical workflows, discrete information values or signal data relating to the first channel information, wherein the at least one alert includes at least one of:
the at least one visual alert;
at least one auditory alert;
at least one email message;
at least one SMS text message;
activation of at least one channel of the plurality of channels; and
a notification to a law enforcement agency; and at least one of:
at least one designated user platform on which the at least one alert is generated; and
at least one identity of at least one other user associated with the user and authenticated by the identity management server to receive the at least one alert.

31. A method for facilitating display of, and interaction with, secure user-centric information via a user platform operated by a user, the method comprising:
A) displaying a desktop on a display device of the user platform as a channel grid framework including a matrix having a plurality of user-selectable items representing a corresponding plurality of authorized channels through which the user receives and/or interacts with respective portions of the secure user-centric information, and
B) receiving configuration information from the user and transmitting the configuration information to at least one external computing device, wherein the configuration information is configured to cause the at least one external computing device to establish a user profile identifying user preferences, platform identities, and service support instructions that determine how the plurality of authorized channels behave on the user platform, wherein the at least one external computing device is configured to synchronize functions and features of one or more of the plurality of channels across a plurality of user platforms by deploying secure user-centric information to the plurality of user platforms;
wherein at least a portion of the user-centric information provided to the user through the plurality of authorized channels is based at least in part on information access rights and/or security protocols respectively associated with the corresponding plurality of channels, the user, and the user platform, and wherein at least a portion of the user-centric information provided to the user through the plurality of authorized channels is based at least in part on the user profile and is provided to the user without being requested by the user; and
wherein at least a portion of the secure user-centric information provided to the user through the plurality of authorized channels is received based in part on a bi-directional interrogation of one or more of the plurality of authorized channels, wherein the bi-directional interrogation comprises the one or more of the plurality of authorized channels interrogating an identity management server, and wherein the bi-directional interrogation further comprises the identity management server and a web services gateway interrogating the one or more of the plurality of authorized channels, wherein the web services gateway is a tool through which the channel grid framework interacts with the identity management server.

32. At least one non-transitory computer readable storage medium storing processor-executable instructions that, when executed by at least one processor, perform a method for facilitating display of, and interaction with, secure user-centric information via a user platform operated by a user, the method comprising:
A) displaying a desktop on a display device of the user platform as a channel grid framework including a matrix having a plurality of user-selectable items representing a corresponding plurality of authorized channels through which the user receives and/or interacts with respective portions of the secure user-centric information, and B) receiving configuration information from the user and transmitting the configuration information to at least one external computing device, wherein the configuration information is configured to cause the at least one external computing device to establish a user profile identifying user preferences, platform identities, and service support instructions that determine how the plurality of authorized channels behave on the user platform, wherein the at least one external computing device is configured to synchronize functions and features of one or more of the plurality of channels across a plurality of user platforms by deploying secure user-centric information to the plurality of user platforms;

wherein at least a portion of the user-centric information provided to the user through the plurality of authorized channels is based at least in part on information access rights and/or security protocols respectively associated with the corresponding plurality of authorized channels, the user, and the user platform, and wherein at least a portion of the user-centric information provided to the user through the plurality of authorized channels is based at least in part on the user profile and is provided to the user without being requested by the user; and wherein at least a portion of the secure user-centric information provided to the user through the plurality of authorized channels is received based in part on a bi-directional interrogation of one or more of the plurality of authorized channels, wherein the bi-directional interrogation comprises the one or more of the plurality of authorized channels interrogating an identity management server, and wherein the bi-directional interrogation further comprises the identity management server and a web services gateway interrogating the one or more of the plurality of authorized channels, wherein the web services gateway is a tool through which the channel grid framework interacts with the identity management server.

33. An apparatus serving as a user platform operated by a user to facilitate display of, and interaction with, secure user-centric information, the apparatus comprising:

a display device to display a desktop for the user platform;
at least one communication interface to facilitate wired and/or wireless communications via one or more transmission media;
at least one memory to store processor-executable instructions; and
at least one processor communicatively coupled to the display device, the at least one communication interface, and the at least one memory, wherein upon execution of the processor-executable instructions by the at least one processor, the at least one processor manages display of and interaction with the secure user-centric information by controlling the display device to display the desktop for the user platform as a channel grid framework including a matrix having a plurality of user-selectable items representing a corresponding plurality of authorized channels through which the user receives and/or interacts with respective portions of the secure user-centric information, wherein:
the channel grid framework occupies a majority of the desktop;
the channel grid framework includes a two-dimensional twelve-item array of identically-sized user-selectable items;
the plurality of user-selectable items included in the channel grid framework is based at least in part on information access rights and/or security protocols respectively associated with the corresponding plurality of channels, the user, and the user platform;

the plurality of authorized channels includes at least a first authorized channel through which the user receives and/or interacts with first authenticated channel information constituting a first portion of the secure user-centric information;

the first authenticated channel information is provided by at least one authenticated channel application and/or at least one authenticated service;

the plurality of user-selectable items includes at least a first user-selectable item representing the first authorized channel;

the at least one processor is further configured to manage display of and interaction with the secure user-centric information by receiving configuration information from the user and transmitting the configuration information to at least one external computing device, wherein the configuration information is configured to cause the at least one external computing device to establish a user profile identifying user preferences, platform identities, and service support instructions that determine how the plurality of authorized channels behave on the user platform, wherein the at least one external computing device is configured to synchronize functions and features of one or more of the plurality of channels across a plurality of user platforms by deploying secure user-centric information to the plurality of user platforms;

at least a portion of the user-centric information provided to the user through the plurality of authorized channels is based at least in part on information access rights and/or security protocols respectively associated with the corresponding plurality of authorized channels, the user, and the user platform, and wherein at least a portion of the user-centric information provided to the user through the plurality of authorized channels is based at least in part on the user profile and is provided to the user without being requested by the user; and at least a portion of the secure user-centric information provided to the user through the plurality of authorized channels is received based in part on a bi-directional interrogation of one or more of the plurality of authorized channels, wherein the bi-directional interrogation comprises the one or more of the plurality of authorized channels interrogating an identity management server, and wherein the bi-directional interrogation further comprises the identity management server and a web services gateway interrogating the one or more of the plurality of authorized channels, wherein the web services gateway is a tool through which the channel grid framework interacts with the identity management server.

34. The apparatus of claim 1, wherein the one or more of the plurality of authorized channels interrogating the identity management server comprises the one or more of the plurality of authorized channels evaluating content provided by the identity management server and determining if services of the one or more of the plurality of authorized channels are available, and wherein the identity management server and the web services gateway interrogating the one or more of the plurality of authorized channels comprises the identity management server evaluating content provided by the one or more of the plurality of authorized channels.

* * * * *